United States Patent [19]

Harrison

[11] 4,327,297
[45] Apr. 27, 1982

[54] SYSTEM FOR GENERATING ENERGY FROM TIDAL ACTIVITY

[76] Inventor: Hubert H. Harrison, 132 Richardson Dr., Mill Valley, Calif. 94941

[21] Appl. No.: 226,066

[22] Filed: Jan. 19, 1981

[51] Int. Cl.³ .......................................... F03B 13/12
[52] U.S. Cl. ..................................... 290/53; 290/42; 417/331
[58] Field of Search .................................. 290/52–55, 290/42–44; 415/210; 417/330–333; 60/398, 499, 502; 405/76, 77

[56] References Cited

U.S. PATENT DOCUMENTS

| | | | |
|---|---|---|---|
| 1,922,055 | 8/1933 | Marx | 405/77 |
| 3,785,159 | 1/1974 | Hammond | 405/77 |
| 3,983,404 | 9/1976 | Sherrard | 417/330 |
| 4,274,008 | 6/1981 | Feltenberger | 290/42 |

*Primary Examiner*—J. V. Truhe
*Assistant Examiner*—Shelley Wade
*Attorney, Agent, or Firm*—Melvin R. Stidham

[57] ABSTRACT

A tide-driven generator comprising a prime mover connected between an inlet conduit which is suspended at a fixed depth near the surface of the ocean and a discharge conduit which is supported on or near the ocean floor. A plurality of outwardly directed ports in the discharge conduit wall enable the continuously flowing, outgoing undertow to entrain and induce flow in the discharge conduit so that there is flow in the system, even at outgoing tide.

4 Claims, 3 Drawing Figures

SYSTEM FOR GENERATING ENERGY FROM TIDAL ACTIVITY

BACKGROUND OF THE INVENTION

Many efforts have been made to utilize the energy in ocean tides and currents, but none has been commercially successful. One problem resides in the fact that the current and tides are generally bi-directional and inconsistent, rendering it difficult to translate it into a uni-directional, constant speed drive, which is desirable for the production of electricity.

OBJECTS OF THE INVENTION

It is an object of this invention to provide a system for generating electricity from ocean currents and tides, including a uni-directional prime mover.

It is a further object of this invention to provide a system for generating energy from ocean tides, which is of basic construction and reliable in operation.

Other objects and advantages of this invention will become apparent from the description to follow, particularly when read in conjunction with the accompanying drawing.

SUMMARY OF THE INVENTION

In carrying out this invention, I provide an inlet conduit and a discharge conduit both of which extend into the ocean from a power generating station on shore. The inlet conduit is suspended from floats or the like so as to be positioned at a relatively shallow depth, but below the more violent action of surface waves. The discharge conduit is positioned on or just above the ocean floor so that the continuously outgoing current or undertow induces outward flow in the discharge conduit as it flows past the discharge opening, as well as past outwardly directed ports in and around the wall of the discharge duct. Hence, at incoming tide there is a positive flow through the inlet conduit and through a prime mover, such as a water turbine, in the power generating station and then out through the outlet discharge duct. Even at outgoing tide, the flow is induced by the constantly outward movement near the ocean bottom, so that there is a constant and continuous undirectional rotation of the turbines, which drive the generators to generate electricity.

DESCRIPTION OF A PREFERRED EMBODIMENT

Figure 2:
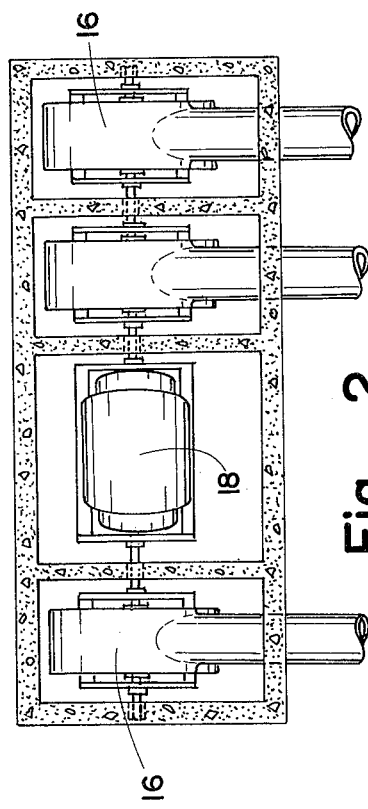
FIG. 2 is a section view of the prime movers and generator forming features of this invention.
Figure 1:
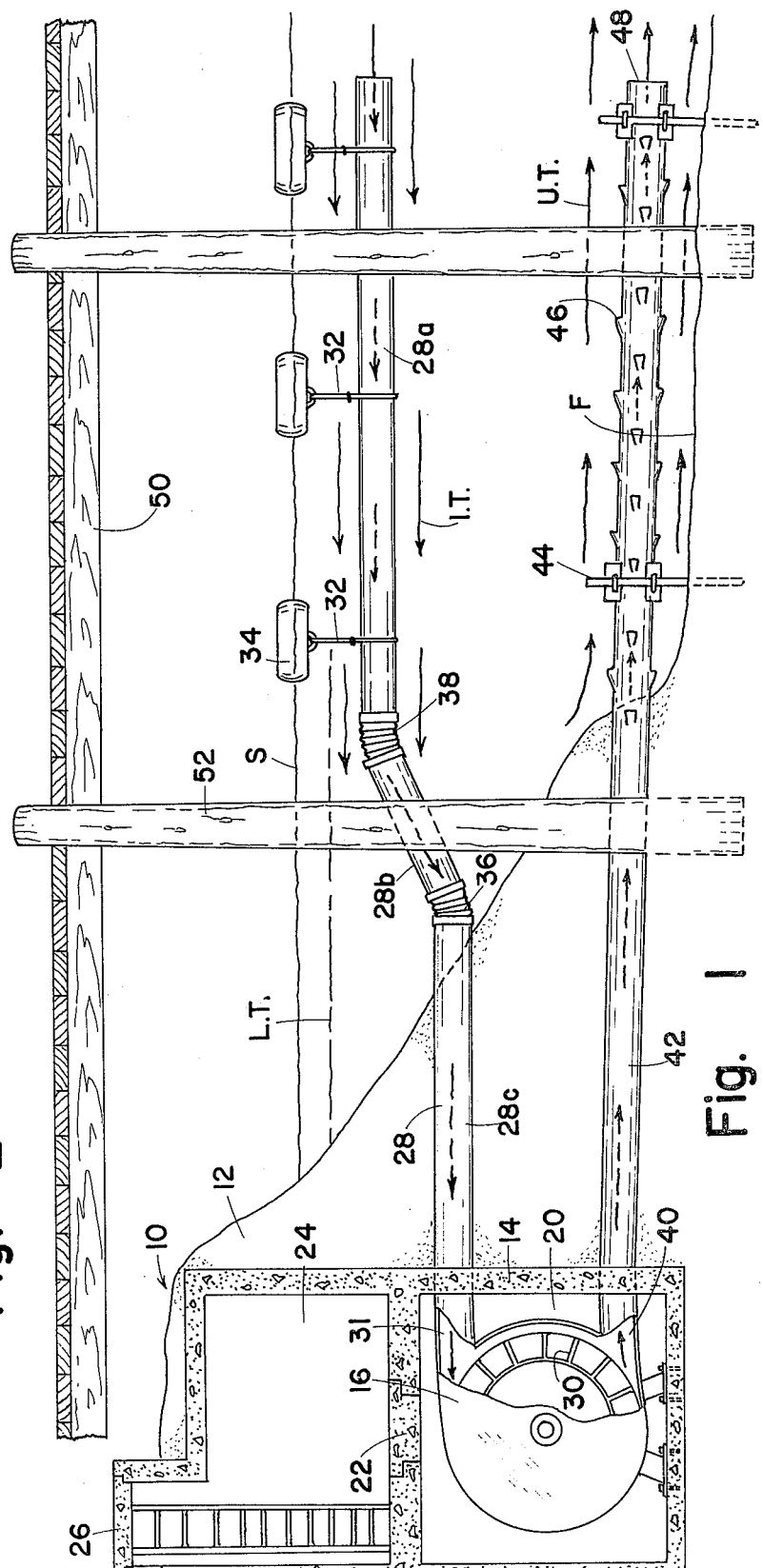
FIG. 1 is a section view showing the energy producing system of this invention.

Referring now to FIG. 1 with greater particularity, the power plant 10 of this invention is preferably located at an on-shore location 12, as in an underground bunker 14 located below the low tide level L.T. Mounted in the bunker power station 12 are one or more rotary water turbines 16, which drive at least one electric generator 18 (FIG. 2). The power room 20 is reached by convenient access openings 22 and a maintenance, crew and communications center may be provided in the space 24 above. The complex is accessible from above ground through a port 26.

Directed to each turbine 16 is an inlet pipe or conduit 28 which discharges seawater into the turbine wheel 30 through a suitable nozzle 31. The inlet pipe is preferably maintained at a suitable depth near the ocean's surface S, but below the low tide line L.T. as by suspending the pipe on cables 32 which, in turn, depend from floats 34. The precise depth at which the inlet pipe 28 is to be maintained, is subject to experimentation, but it should be close enough to the surface that the full effects of incoming tides I.T. may be utilized, but deep enough that the rotational and reciprocal movements of the wave action are not counterproductive. The inlet pipe 28 may be provided with flexible joints 36 and 38 so that the outer extent of pipe 28a can be maintained at the desired depth through changing tides, while a certain amount of gravity feed can be utilized at a downward slope 28b directed to the stationary, horizontal delivery length 28c.

Figure 3:
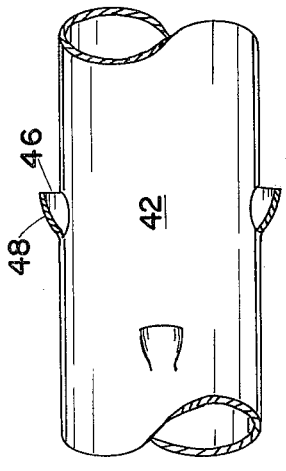
FIG. 3 is an enlarged section view showing a flow producing discharge pipe.

Extending from an outlet 40 from each turbine 16 as a discharge pipe 42 which extends on or along the ocean floor F as by means of suitable anchors 44. As indicated by the arrows U.T. in FIG. 2, the tidal flow or undertow along the ocean floor is constantly in an outward direction. Taking advantage of this characteristic, there are provided in the outer stretches of the discharge pipe 42 a multiplicity of ports 46 (FIG. 3), which preferably have cowlings 48 over which the current flows, creating a low pressure area which entrains the water from within the pipe and induces its flow along with the current represented by the arrows U.T. Further flow is likewise induced at the discharge opening 48. Hence, even at outgoing tides, the undertow U.T. persists and flow is induced through the discharge pipe 42 which, in turn, induces flow through the inlet pipe 28. At incoming tides, indicated by the arrows I.T. there is positive flow through the inlet pipe 28 to drive the turbine 16. Hence, the turbine 16 and generator 18 may be kept in constant rotation for continuous power production.

As shown in FIG. 1, the system conduit 28 and 42 may be positioned below a suitable pier 50 mounted on the pilings 52 where the effects of the surface wave action are minimized.

While this invention has been described in conjunction with the preferred embodiment thereof, it is obvious that modifications and changes therein may be made by those skilled in the art without departing from the spirit and scope of this invention, as defined by the claims appended hereto.

What is claimed as invention is:

1. A tide-driven generator comprising:
   an on-shore power station;
   an inlet conduit extending from a predetermined depth below the zone of surface wave action of a body of sea water to said station;
   means for maintaining said inlet conduit at said predetermined depth;
   a discharge conduit extending from said station, along the ocean bed to open into said body of sea water adjacent the ocean bed; and
   a prime mover at said station connected between said inlet and discharge conduit to be driven by flow of sea water therethrough.

2. The tide-driven generator defined by claim 1 including:

a plurality of downstream-directed ports around and along said discharge conduit so that outgoing tide will promote flow therethrough.

3. The tide-driven generator defined by claim 1 wherein said depth maintaining means comprises:
a plurality of floats; and
a plurality of suspension members secured to and along said inlet conduit;
each of said suspension members being secured to a float.

4. The tide-driven generator defined by claim 1 wherein:
said prime mover is a rotary turbine.

* * * * *